June 6, 1961

P. GRANDSTAFF 2,986,938

PRESSURE GAGE

Filed Aug. 19, 1955

Perry Grandstaff
INVENTOR.

BY Murray Robinson
ATTORNEY

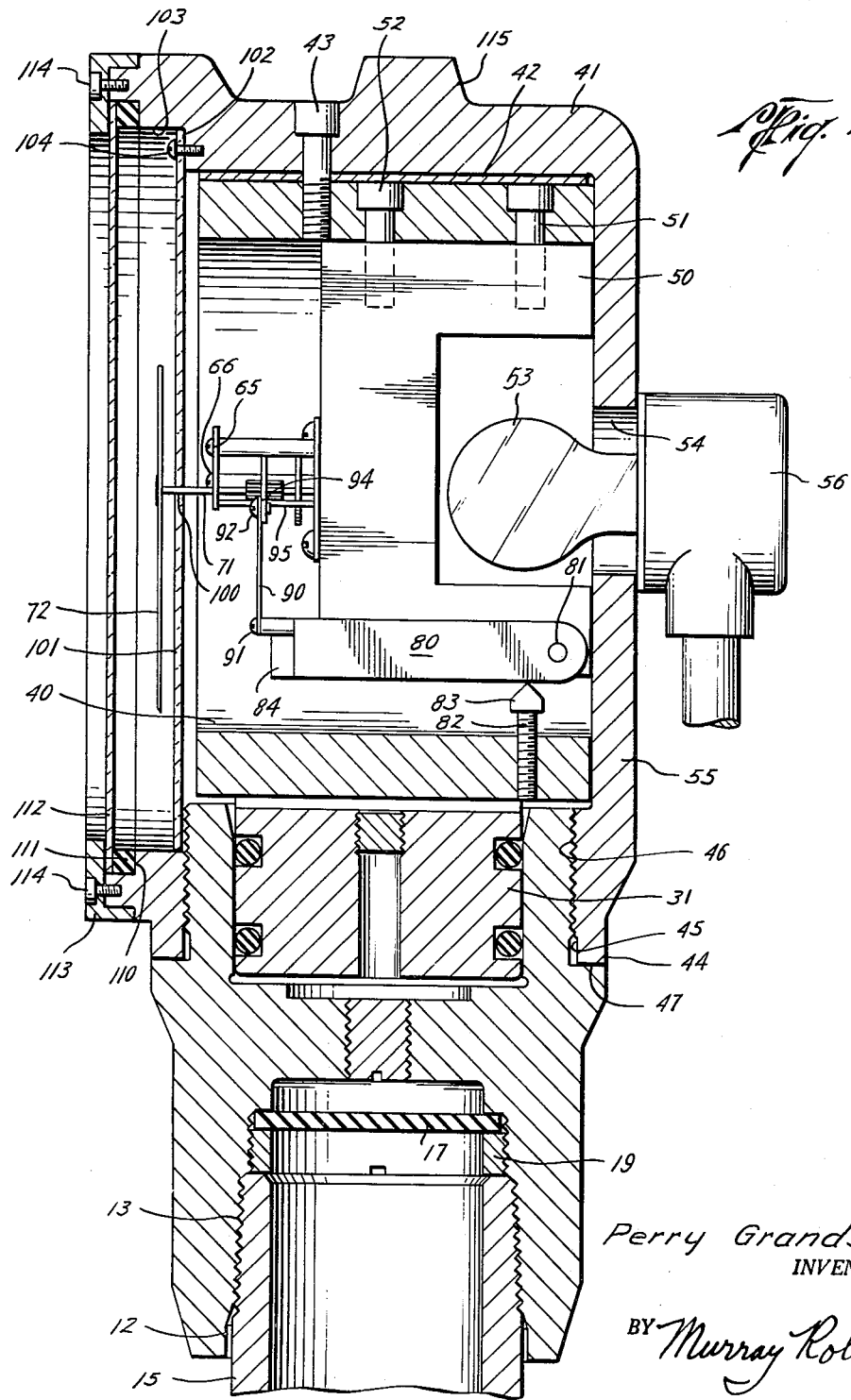

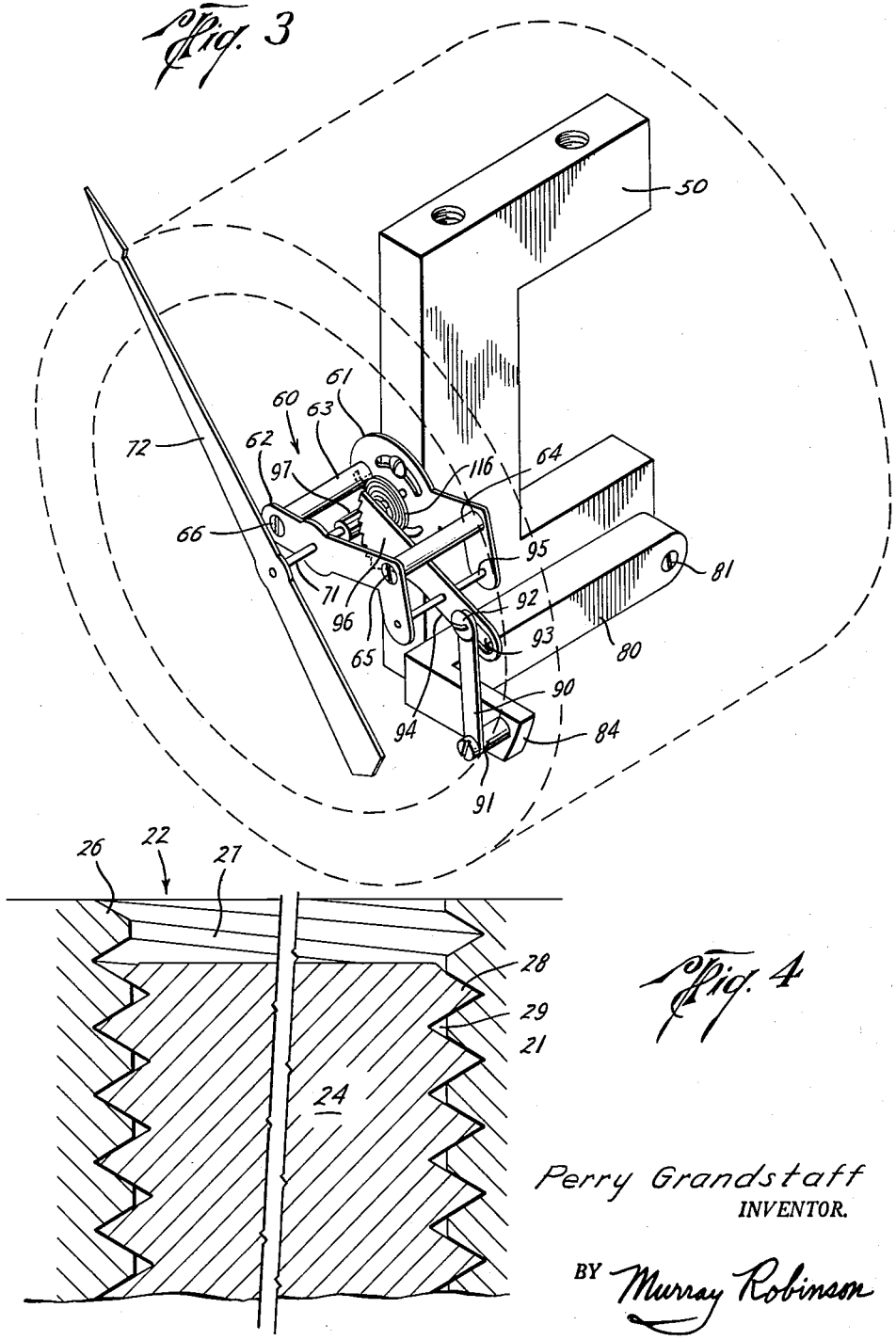

United States Patent Office 2,986,938
Patented June 6, 1961

2,986,938
PRESSURE GAGE
Perry Grandstaff, Warr Acres, Okla., assignor to Little Giant Corporation, a corporation of Oklahoma
Filed Aug. 19, 1955, Ser. No. 529,405
3 Claims. (Cl. 73—392)

This invention pertains to measuring and indicating instruments, and more particularly to a mud pressure gage for measuring and indicating the pressure in a pipe used to supply mud to a drill pipe used in the rotary system of well drilling.

Measuring usually is accomplished by comparing the thing to be measured with a known thing. In the present case the mud line pressure is compared with the stress in a proving ring. According to the invention there is provided an improved structure for measuring mud line pressure by means of a proving ring.

Indicators usually translate some relatively undiscernable phenomena into something cognizable by one of the human senses, such as sound or sight. In the present case the indicator produces a visible movement of a pointer in front of a scale. According to the invention there is provided an improved structure for translating strain in the proving ring into motion of the pointer.

Certain advantages of the improved measuring and indicating structures of the gage are its ability to measure the pressure of fluids of an abrasive or corrosive nature, its simple and reliable adjustment to damp out pressure oscillations and indicate a steady mean, its easy adaptability to the measurement of different ranges of pressure, its ruggedness and shock resisting ability particularly desirable in the oil field, the ease of adjusting the gage pointer for zero reading and the transmission ratio of the indicator part of the gage, and the ease of reading the indicator.

Particular objects of the invention are to provide a gage that is highly accurate, yet easily read and which can be easily and inexpensively manufactured and maintained, and which is safe and reliable in operation.

Other objects and advantages of the invention will appear from the following description of a preferred embodiment thereof, reference being made to the accompanying drawings wherein:

FIGURE 2 is a section taken on line 2—2 of FIGURE 1;

FIGURE 3 is a perspective of part of the indicator portion of the gage; and

FIGURE 4 is a sectional detail of the damper threads.

Figure 1:
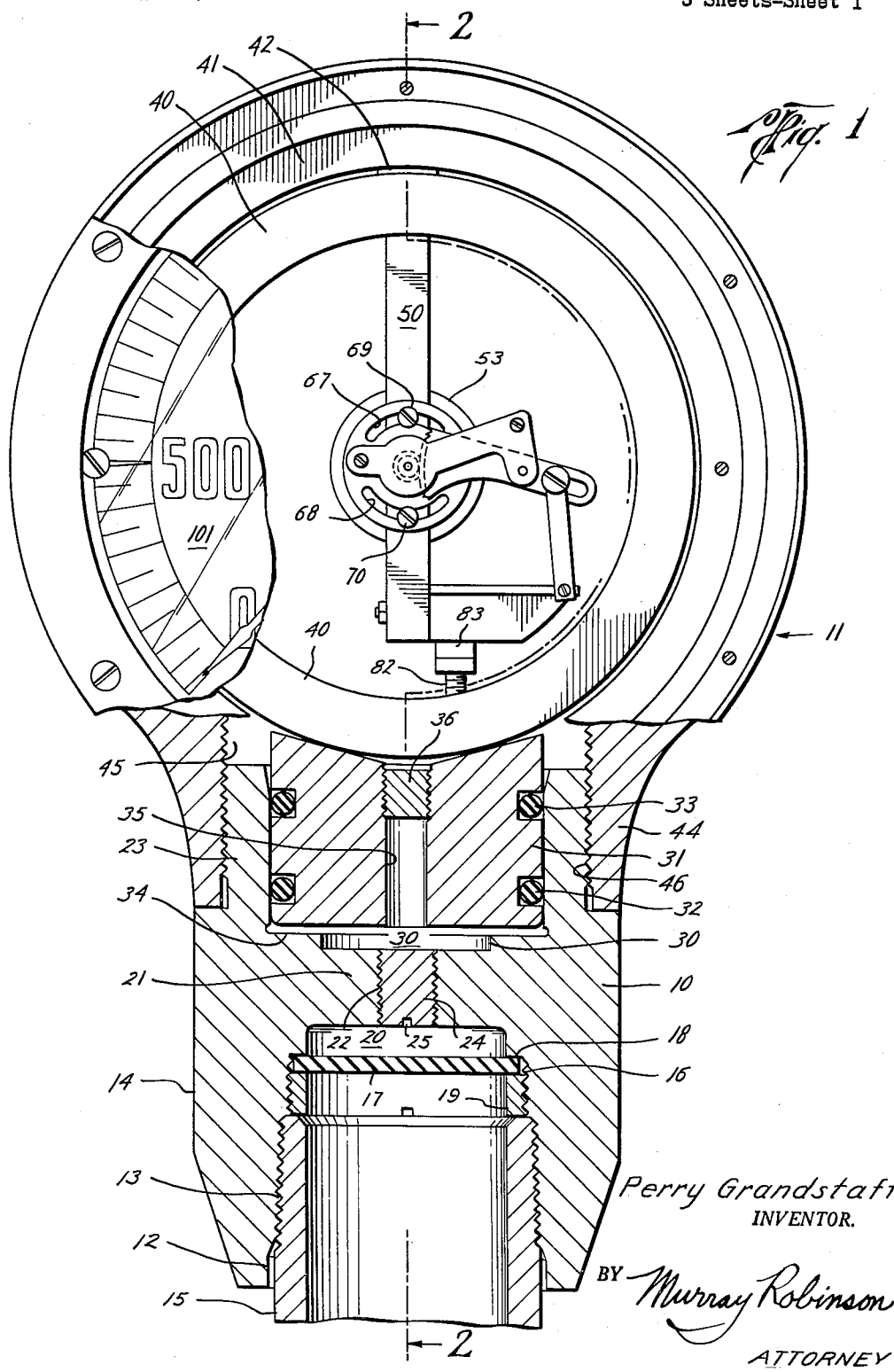
FIGURE 1 is a front view with the dial face cover partly broken away to show the interior of the indicator and the lower part of the gage shown in section.

Referring now to FIGURE 1, there is shown a gage comprising a stem 10 supporting a body 11. Support 11 includes a socket portion 12 which is internally threaded at 13 and provided with a hexagonal flat sided exterior at 14 for engaging a wrench, whereby the gage stem can be screwed onto a threaded pipe 15 in communication with a mud line or other system containing fluid whose pressure is to be measured.

An internally threaded counterbore 16 at the bottom of socket portion 13 receives a flexible diaphragm 17 which is held in place against shoulder 18 at the bottom of the counterbore by a threaded ring 19. Diaphagm 17 is made of a material that will not deteriorate rapidly under the influence of the fluid whose pressure is to be measured. In the case of a mud gage the diaphragm may be made of neoprene or other oil and water resistant rubber-like elastomeric material.

Inside shoulder 18 forming the bottom of counterbore 16 is another counterbore forming a chamber 20. The bottom of chamber 20 is closed by partition 21 except for a threaded hole 22 extending therethrough communicating with the interior of cylinder portion 23 at the upper end of the gage stem. A threaded plug 24 is screwed into partition 21, there being a screw driver slot 25 in the lower end of plug 24 whereby it can easily be screwed in or out of the partition.

Referring now to FIGURE 4 there is shown to a larger scale a portion of plug 24 in hole 22 in partition 21. It will be seen that thread 26 of the hole 22 have flat crests 27 whereas the interthread spaces of the thread 28 on plug 24 are full depth so that there is a helical passage 29 formed between the threads 26 and 28 which places chamber 20 in communication with the interior of cylinder 23. Depending on how far the plug 24 is screwed into hole 22, the length of passage 29 will be longer or shorter. The structure just described thus constitutes a variable choke.

Referring again to FIGURE 1, there is a chamber 30 formed inside cylinder 23 between partition 21 and a piston 31 reciprocably disposed in cylinder 23. O rings 32, 33 of neoprene or other oil resistant rubber-like elastomeric material seal between the piston and cylinder. There is a counterbore 30' in the bottom of cylinder 23 forming a shoulder 34 which limits the inward travel of piston 31 so that there is always some space below the piston.

Chambers 20 and 30 and the passage 29 therebetween is filled with oil. In order to make it easy to assemble the gage with no air in this oil space, there is provided a hole 35 in piston 31, the upper end of the hole being threaded and closed by a screw plug 36, which is put in place only after the chambers 20 and 30 and passage 29 and hole 35 have been filled with oil.

Referring now to both FIGURES 1 and 2, the upper end of piston 31 is of V-shape to engage proving ring 40 at points other than adjacent hole 35 and plug 36. The proving ring 40 is mounted inside a housing 41 forming part of the body 11 of the gage. Housing 41 has the shape of a cylindrical cup with its cylinder axis horizontal. Proving ring 40 is spaced from the upper inner periphery of the housing by a bearing shim 42 and is held thereto by a screw 43 extending through the housing and shim. Housing 41 has a neck 44 extending from the lower side thereof and there is an internally threaded passage 45 through the neck and lower side of the housing which is screwed over the upper exteriorly threaded reduced end portion 46 of cylinder portion 23 of the gage stem 10. It is through passage 45 that piston 31 engages the lower part of proving ring 40. Shoulder 47 on stem 10 abuts the lower end of the neck 44 on the housing 41.

Within proving ring 40 there is disposed a support block 50 (see also FIGURE 3) which is held to the top of the proving ring by screws 51, 52. The block is of U-shape so as to leave space for an electric light bulb 53 which passes through a hole 54 in the back 55 of the housing and is mounted in an electric socket 56 covering hole 54 and secured to the back of the housing.

There is a frame 60 mounted on the front edge of block 50. Frame 50 comprises inner and outer L-shaped plates 61, 62 held in spaced apart relationship by tubes 63, 64 and held together by screws 65, 66 passing through the tubes. Plate 61 has a pair of arcuate co-centric slots 67, 68 therein, and screws 69, 70 through these slots adjustably secure the frame 60 to the front edge of support block 50. By loosening screws 69, 70, the frame can be rotated somewhat about the center of the arcs. Coaxial with this same center there are bearing openings in plates 61 and 62 in which shaft 71 is rotatably mounted. Keyed to shaft 71 is a pointer 72.

An L-shaped lever 80 is povitally mounted at 81 on one side of block 50 near the lower edge thereof. A screw 82 (best shown in FIGURE 1), having a knife edge 83 at its upper edge, is screwed into proving ring 40 at the lower inner periphery thereof. The knife edge 83 bears against lever 80 close to its fulcrum 81 so that small movements of the proving ring cause larger movements of the end 84 of lever 80.

A link 90 is pivotally mounted at 91 on the end 84 of lever 80. The other end of link 90 has a hole therethrough and a screw 92 through this hole and a slot 93 (see FIGURE 3) in a lever 94 adjustable connects link 90 to the end of lever 94. Lever 94 is rotatably mounted on shaft 95 supported in frame 60. Lever 94 carries a gear sector 96 at its other end which engages a pinion 97 keyed to shaft 71. By the foregoing means, radial strains of the proving ring are amplified and transmitted to the pointer 72. Slight adjustment of the transmission ratio can be made by varying the distance from shaft 95 at which link 90 is connected at lever 94, this being accomplished by means of screw 92 and slot 93. Adjustment can also be made of the zero position of the pointer by rotating frame 60 relative to block 50; as frame 60 is rotated, shaft 95 carried thereby is revolved around shaft 71, and in order to maintain screw 92 forming the pivotal connection between lever 94 and link 90 in the same place, corresponding to zero strain of the proving ring for example, the pinion 97 and pointer 72 will have to turn; in this manner rotation of frame 50 causes rotation of pointer 72 until it reads zero against the indicator scale next to be described.

Referring now to FIGURES 1 and 2, pointer shaft 71 passes through a hole 100 in a translucent dial face disc 101 graduated to indicate pressure in conjunction with pointer 72 which rotates in front of disc 101, the dial face disc and pointer being illuminated by light bulb 53 for easy reading. Disc 101 is supported on shoulder 102 at the bottom of counterbore 103 in the front of housing 41. Disc 101 is held against shoulder 102 by screws 104.

Within an annular rabbet 110 at the front edge of housing 41 is disposed a rubber gasket 111 against which rests a glass or plastic cover 112 which is held in place by a bezel ring 113 secured to housing 41 by screws 114.

From the foregoing description it is believed to be apparent that when the gage is in use the diaphragm 17 will exclude from the gage mechanism mud or other fluid in the line whose pressure is to be measured, but will transmit such pressure to the oil or other liquid in space 20. The oil in turn, will transmit the pressure through helical passage 29 to the underside of piston 31 in chamber 30, pressure fluctuations being damped out by the friction of the oil in passage 29, the degree of damping depending on the length of passage 29. Piston 31 will transmit the pressure to the proving ring which will be compressed radially between piston 31 and housing 41, the latter being reinforced by annular rib 115. The radial strain of the proving ring will be transmitted by pin 82 to pointer 72 in amplified form by the lever 80, link 90, lever 94, sector 96, pinion 97 and shaft 71. Backlash in the indicating system is taken up by helical spring 116 connected at one end to frame 60 and at the other to shaft 71.

It is to be noted that piston 31 is positively retained in stem 10 between proving ring 40 and partition 21, so that even if diaphragm 17 should break the fluid in the line being measured would not blow the piston out of the gage, which is an important safety feature for a mud gage which is connected to a mud line whose pressure may be 3000 pounds per square inch.

It is also to be noted that the size of the proving ring is such that it will have a deflection of only .030 inch under a 3000 p.s.i. mud line pressure with a piston diameter of about two inches. With this small travel there will be little wear on the piston and diaphragm. Furthermore, the proving ring travel is so slight that its deformation will be highly linear over such small range and hence very accurate when used in conjunction with the uniformly graduated linear dial face 101.

The same general construction of gage can be readily adapted to different pressure ranges by varying the diameter of piston and cylinder used in connection therewith, that is, by substituting different stem assemblies.

It is further to be observed that the arrangement according to the invention in which the indicating transmission and illuminating means are disposed within the proving ring of the measurement system effects a great economy of space, as does also the use of a circular proving ring behind a circular dial face inside a circular housing, all coaxial.

While a preferred embodiment of the invention has been shown and described many modifications thereof can be made by one skilled in the art without departing from the spirit of the invention and it is desired to protect by Letters Patent all forms of the invention falling within the scope of the following claims:

I claim:

1. A pressure gage comprising a housing having an opening in one side thereof, a stem connected to said housing over said opening, said stem having a cylindrical recess in the end thereof adjacent said opening, a piston slidably disposed in said recess, means to transmit pressure through the other end of said stem to said piston, a proving ring inside said housing, means supporting said proving ring inside said housing in spaced relationship to said housing and with a diameter of the proving ring aligned with the piston axis, said piston extending through said housing to engage an area of said proving ring, said supporting means engaging said proving ring at an area diametrically opposite from said piston, means engaging said proving ring within said areas of engagement thereof by said supporting means and piston to indicate relative movement of said areas along said diameter, said proving ring being free of contact with any other elements throughout its entire circumferential extent except at said areas, the end of said piston that engages said proving ring having a V-shaped groove therein with the groove axis parallel to the axis of the proving ring, said area of engagement of said piston with the proving ring comprising two portions spaced apart symmetrically on either side of said groove and said piston axis, said means to transmit pressure to said piston comprising an aperture in said opposite end of the stem having an annular shoulder therein, a circular disc shaped rubber diaphragm disposed against said shoulder, a ring in threaded engagement with said aperture disposed adjacent said diaphragm on the opposite side thereof from said shoulder releasably retaining said diaphragm in position, said stem having a partition thereacross between said piston receiving recess and said diaphragm receiving aperture, said partition having an opening therethrough with a variable choke disposed in said opening, the space between said diaphragm and piston being filled with liquid, said stem, piston, recess, aperture, diaphragm, annular shoulder, and partition opening being concentric, said piston having an axial passage therethrough terminating adjacent said proving ring between said spaced apart portions of the area of engagement of the proving ring and piston, said axial passage providing means for introducing said liquid into said gage, and a screw plug closing said passage.

2. A pressure gage comprising a one-piece housing member having an annular portion with an opening in one side of said annular portion, a one-piece stem connected to said housing member over said opening, said stem having a cylindrical recess in the end thereof adjacent said opening, said recess extending only part way through said stem whereby the stem provides side and bottom walls for the recess, a cylindrical piston disposed in said recess, the mouth of said recess where the recess opens to said housing member having a diameter large enough to receive the maximum outer diameter of said piston, a proving ring disposed inside of said housing member within said annular portion thereof, said proving ring having a smaller outer diameter than the inner diameter of said annular portion of the housing member, bearing means on the inside of said annular portion opposite said opening therein and engaging the outer peripheral surface of said proving ring, said piston extending through said opening in said annular portion of the housing member and engaging the outer peripheral surface of said proving ring, said piston and bearing means holding said proving ring therebetween out of contact with said annular portion of the housing member with a diameter of the proving ring aligned with the axis of the piston, indicator means engaging the proving ring at spaced apart positions and responsive to relative movement thereof, and means to transmit pressure through said stem to said recess beneath said piston causing said piston to exert a force against said proving ring, the reaction of said proving ring against said bearing means being transmitted by said housing member back to said stem, whereby said pressure is measured by said indicator means due to compression of said proving ring between said bearing means and piston.

3. A pressure gage comprising a housing having an annular portion with an opening in one side of said annular portion and a tubular stem connected over said opening, a piston disposed in said stem, a proving ring disposed inside of said housing within said annular portion thereof, said proving ring having a smaller outer diameter than the inner diameter of said annular portion of the housing, bearing means on the inside of said annular portion directly opposite said opening therein and engaging said proving ring, said piston extending through said opening in said annular portion of the housing member and engaging said proving ring, said piston and bearing means holding said proving ring therebetween out of contact with said annular portion of the housing with a fluid space therebetween and with a diameter of the proving ring aligned with the axis of the piston, indicator means engaging only the proving ring at spaced apart positions on said proving ring and responsive to relative movement of said positions, pressure in said stem beneath said piston causing said piston to exert a force against said proving ring, the reaction of said proving ring against said bearing means being transmitted by said annular portion of said housing back to said stem without the resulting strain in sad annular portion directly affecting said indicator means, whereby said pressure is measured by said indicator means solely due to compression of said proving ring between said bearing means and piston while said proving ring is free to expand at right angles to the piston axis into said fluid space.

References Cited in the file of this patent

UNITED STATES PATENTS

| | | |
|---|---|---|
| 45,247 | Jepson | Nov. 29, 1864 |
| 641,302 | Lane | Jan. 16, 1900 |
| 1,917,949 | Raisch | July 11, 1933 |
| 2,037,425 | Martin | Apr. 14, 1936 |
| 2,541,790 | Sugden | Feb. 13, 1951 |
| 2,580,999 | Conrad | Jan. 1, 1952 |
| 2,593,169 | Moore | Apr. 15, 1952 |
| 2,719,430 | Dillon | Oct. 4, 1955 |